March 5, 1957 M. W. HAINES 2,783,809
DIFFERENTIAL SCREW THREAD CONSTRUCTION
Filed Nov. 28, 1952 4 Sheets-Sheet 1
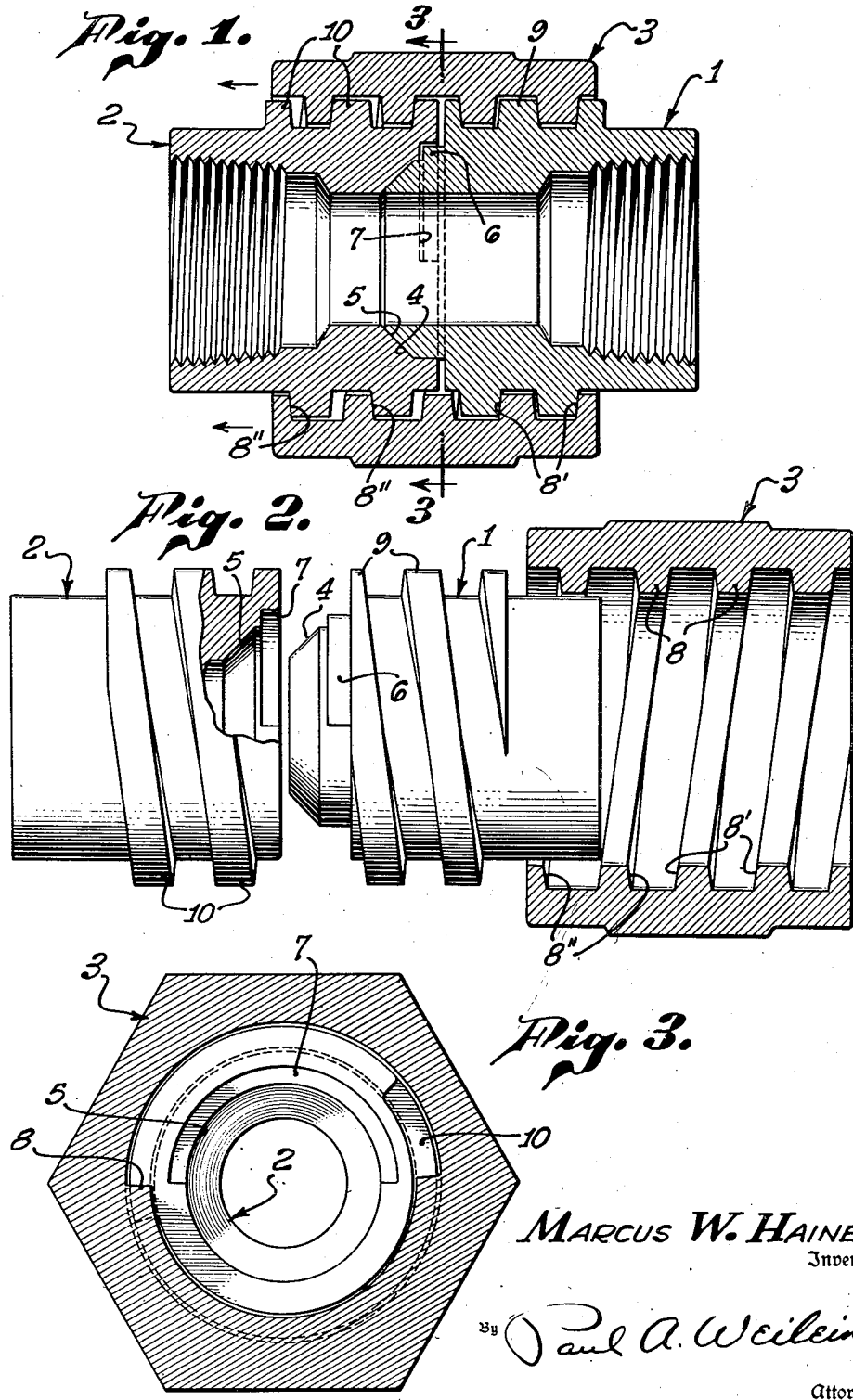
Marcus W. Haines,
Inventor
By Paul A. Weilein
Attorney

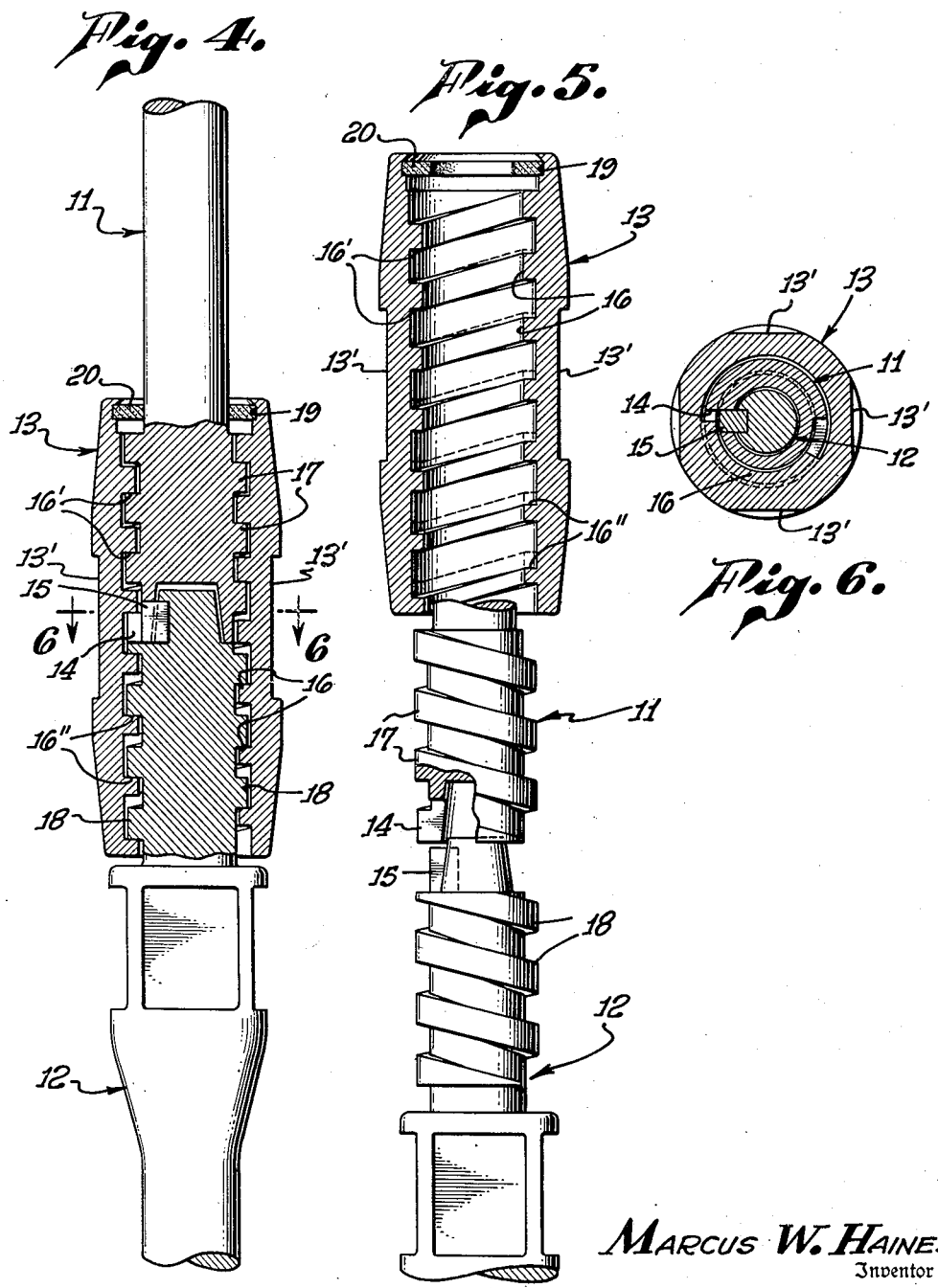

March 5, 1957  M. W. HAINES  2,783,809
DIFFERENTIAL SCREW THREAD CONSTRUCTION
Filed Nov. 28, 1952  4 Sheets-Sheet 3
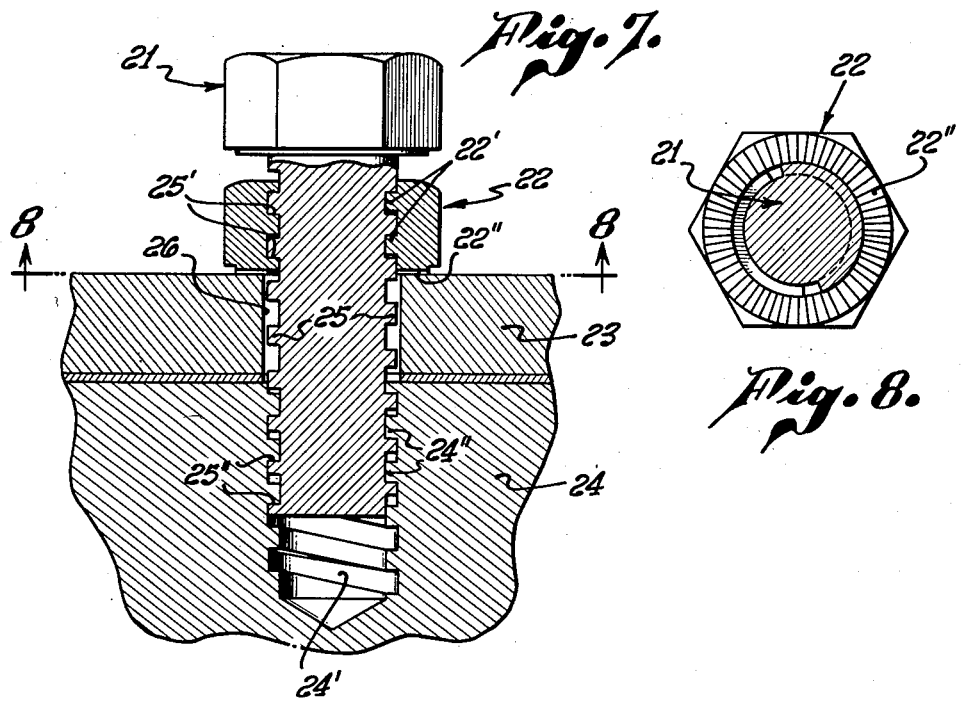
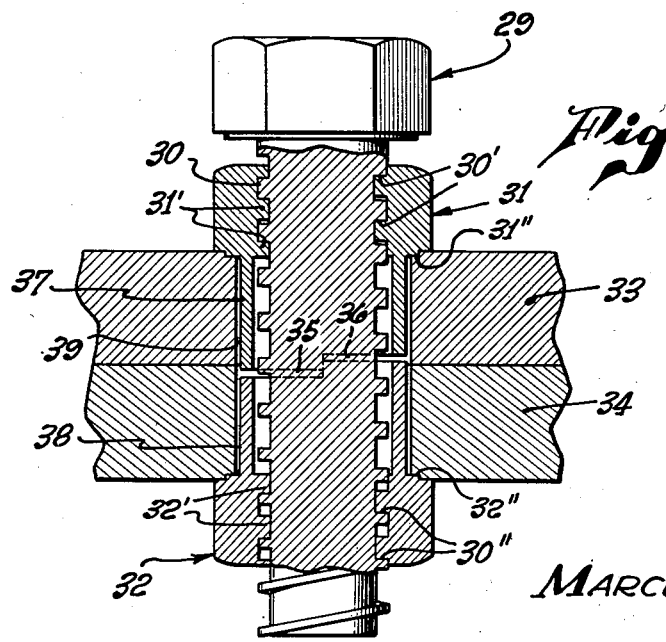
Marcus W. Haines,
Inventor
By Paul A. Weilein
Attorney

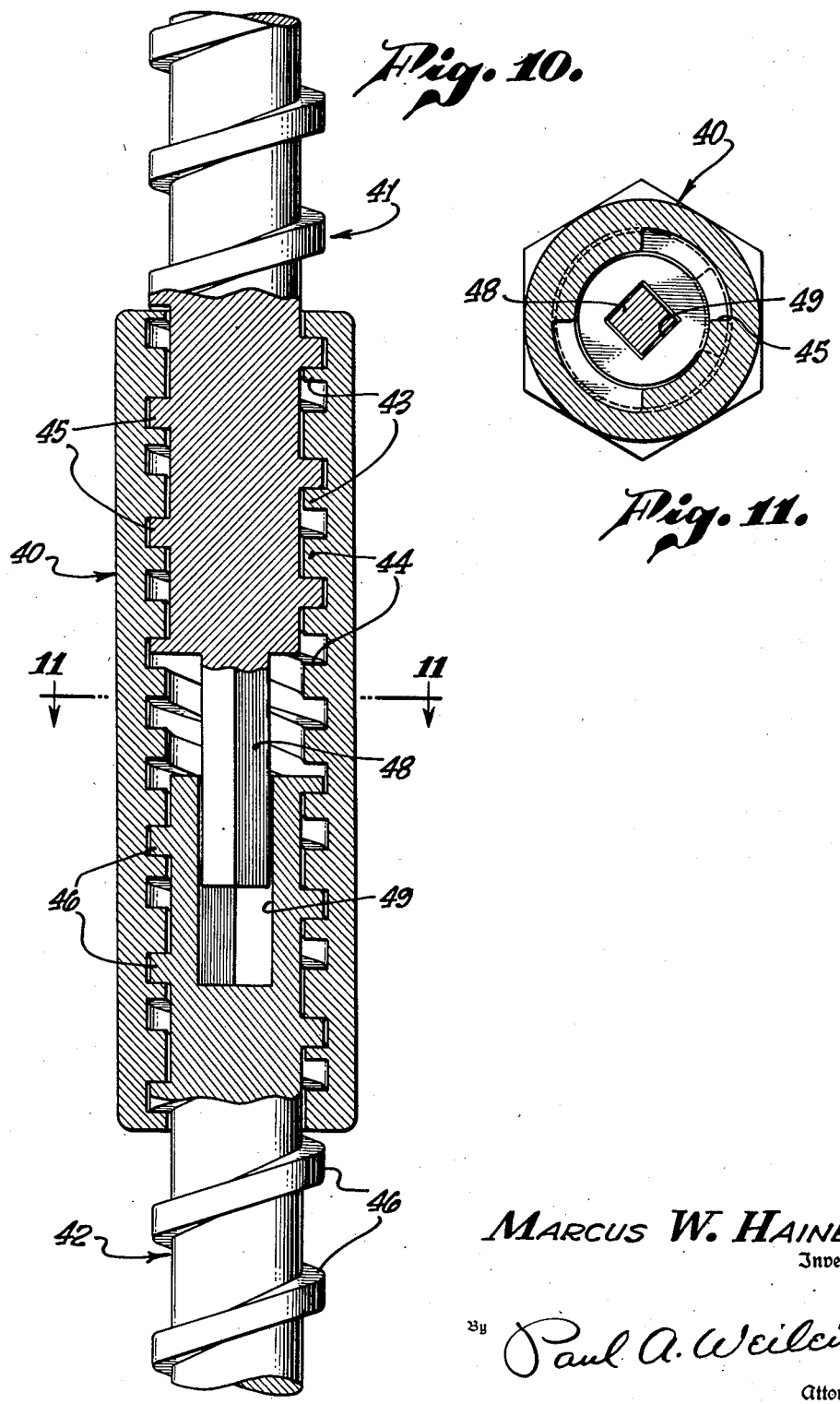

United States Patent Office 2,783,809
Patented Mar. 5, 1957

2,783,809

DIFFERENTIAL SCREW THREAD CONSTRUCTION

Marcus W. Haines, Long Beach, Calif., assignor, by mesne assignments, to McGaffey-Taylor Corporation, Long Beach, Calif., a corporation of California Application November 28, 1952, Serial No. 323,012

13 Claims. (Cl. 151—14)

This invention relates to screw threaded members such as bolts, studs, nuts, coupling and clamping members, as well as devices adapted to be joined or clamped or operated for force applying purposes by means of screw threads.

More particularly, this invention relates to improvements in screw threaded members and devices employing differential screw threads.

It is an object of this invention to provide a novel construction and arrangement of coacting differential screw threads for members and devices such as described, whereby these members and devices will be improved as to performance, thread strength, overall strength, durability, economy of material, and capability of developing and maintaining the desired force for clamping, connecting, holding and other purposes where the application of such force is desired.

It is another object of this invention to provide a construction such as described, wherein the resiliency of the material of which the screw threaded members and devices are formed, is employed in a particularly efficient manner to assure a reliable holding force without dangerous stressing or weakening of the screw threads or of such members and devices.

It is a further object of this invention to provide a construction such as described, which makes it possible to provide the desired leverage and force with a comparatively small number of screw threads per inch in the members adapted to be connected or operated for force applying purposes.

It is another object of this invention to provide a construction such as described, wherein coacting screw threads of large lead and of the same hand and same pitch diameter but having a small lead differential, make possible the objects and advantages hereof.

It is another object hereof to provide a construction such as described, wherein a single screw thread on a connecting member is formed so that opposite side faces of the single thread serve as screw threads of differential lead adapted to coact with matching screw threads on members subject to connection by the connecting member, whereby the desired clamping, holding or other force may be developed by the threaded coaction of such members.

It is a further object of this invention to provide a screw threaded device for effecting a reliable connecting or force applying operation, wherein a pair of screw threaded members are joined in opposed relation to one another by the threaded engagement thereof with a third member having coextensive differential screw thread leads matching differential leads of the screw threads on the respective members of said pair.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a longitudinal sectional view of a pipe union embodying the present invention;

Fig. 2 is an exploded view of the union as partially assembled, shown partly in section and partly in elevation;

Fig. 3 is a cross sectional view taken on the line 3—3 of Fig. 1;

Fig. 4 is a longitudinal sectional view of a modified form of this invention as embodied in a sucker rod coupling;

Fig. 5 is an exploded and fragmentary view partly in elevation of the coupling shown in Fig. 4 as partially assembled;

Fig. 6 is a cross sectional view taken on the line 6—6 of Fig. 4;

Fig. 7 is a sectional view, partly in elevation, of another modified form of this invention;

Fig. 8 is a sectional view taken on the line 8—8 of Fig. 7;

Fig. 9 is a view similar to Fig. 7 of another modified form of this invention;

Fig. 10 is a sectional view, partly in elevation, of another modified form of this invention; and Fig. 11 is a cross sectional view taken on the line 11—11 of Fig. 10.

As shown in Figs. 1–3, one form of this invention is embodied in a pipe union comprising a pair of internally and externally screw threaded coupling members 1 and 2 adapted to be joined in end-to-end relation by means of an internally threaded connecting member 3 which is in the form of a sleeve.

Opposed ends of the members 1 and 2 are provided with interengageable annular surfaces 4 and 5 for forming a seal between the members 1 and 2. The members 1 and 2 are also provided at their opposed ends with interengageable clutch elements 6 and 7 to prevent relative rotation between the members 1 and 2.

In accordance with this invention, the connecting member 3 is provided with coarse internal screw threads 8 of the square type. These threads, after being cut to have a given lead, for example, a lead of .3333, as provided by three (3) threads per inch, are cut on the flat faces of one side thereof to provide these faces with a different lead, for example a lead of .3478 as produced by two and seven eights (2⅞) threads per inch. As here shown, the side faces 8' of the threads 8 provide the equivalent of three threads per inch, whereas the other side faces 8'' provide the equivalent of 2⅞ threads per inch. Thus, the one thread 8 forms in effect a pair of coextensive threads of differential leads of the same hand and of the same pitch diameter.

The coupling member 1 has external screw threads 9 of the same square formation, the same hand and the same pitch diameter, as the threads 8 on the member 3. The threads 9 are of the same lead as the thread faces 8' on the member 3.

The member 2 is provided with square threads 10 of the same lead as the thread faces 8'' of the threads 8 on the member 3. The threads 10 are of the same hand and same pitch diameter as the threads on the members 1 and 3.

In the operation of this union, the members 1 and 2 are coupled in end-to-end relation by means of the clutch elements 6 and 7, with the screw threads 9 and 10 thereof in alignment, as shown in Fig. 1. Next, the connecting member 3, which may be of polygonal cross section to facilitate turning thereof with a wrench, is threadly engaged with the member 1 and advanced thereon so as to become threadedly engaged with the member 2. Thereafter, rotation of the member 3, will cause the members 1 and 2 to be urged toward one another a distance equal to the difference between the leads of the threads on the members 1 and 2, this being the same distance as the difference between the leads of the faces 8' and 8" of the threads 8 on the member 3. Thus, the compression force provided at the sealing surfaces 4 and 5 is proportional to the force applied through the member 3 and the differential leads on the members 1 and 2.

A modified form of this invention, as shown in Figs. 4, 5 and 6, is embodied in a coupling particularly adapted for joining sucker rod sections 11 and 12 used in pumping oil wells. This coupling is similar to the pipe union shown in Figs. 1 and 2, in that the opposed screw threaded ends of the sucker rod members 11 and 12, together with an internally threaded sleeve member 13 for joining the members 11 and 12, are comparable to the members 1, 2 and 3 respectively of that union.

Cooperable clutch elements 14 and 15, corresponding to the elements 6 and 7, shown in Figs. 1 and 2, are provided on the opposed ends of the members 11 and 12 to prevent relative rotation thereof. However, no sealing means as provided in the union shown in Figs. 1 and 2 is necessary at the opposed ends of the members 11 and 12.

The sleeve member 13 is provided with a screw thread 16, of the square type throughout the length thereof. These threads are formed in the same manner as the threads 8 shown in Figs. 1, 2 and 3, in that the side faces 16' thereof extend substantially at right angles to the axis of the sleeve and have a given lead, whereas the other faces 16", likewise substantially at right angles to said axis, have a different lead. Thus, as in the union shown in Figs. 1 and 2, the single thread 16, by reason of its opposite side faces, serves the purpose of two sets of threads of differential leads and of the same pitch diameter and the same hand.

The member 11 is provided with square screw threads 17 of the same lead, hand and pitch diameter as the side faces 16' of the threads 16, whereas the member 12 has external square threads 18 of the same lead, hand and pitch diameter as the side faces 16" of the threads 16. Thus, all of the screw threads on the members 11, 12 and 13 are of the same pitch diameter and same hand, thereby facilitating assembly and disassembly of the coupling.

In the operation of this coupling, the members 11 and 12 are coupled in end to end relation by the clutch elements 14 and 15, and the sleeve 13 is threaded onto the members 1 and 2, in the same manner as in assembling the pipe union shown in Figs. 1, 2 and 3.

The sleeve 13 is provided with a plurality of flat faces 13' for engagement by a wrench, not shown, for turning the sleeve into secure threaded engagement with the members 11 and 12.

At its upper end the sleeve 13 may be provided with a counterbore 19 for reception of a gasket 20 for forming a seal between the sleeve 13 and the member 11, as shown in Fig. 4.

The same advantageous tightening force as provided in connection with the pipe union is obtained when the sleeve 13 is turned about its axis while in threaded engagement with the members 11 and 12. In this case, the members 11 and 12 are moved toward one another a distance equal to the difference between the leads of the threads on the members 11 and 12, with each rotation of the sleeve 13.

It should be noted that in the two forms of this invention shown in Figs. 1–6, the connecting sleeves 3 and 13 are substantially identical, as each has a single square thread formed to provide coextensive threads of the same pitch diameter but of small differential lead. This construction provides for the utilization of the entire working length of these sleeves in tension in order that the members joined by these sleeves will be resiliently held together. Moreover, those portions of the opposed members held together by threaded contact thereof with the sleeves, are maintained under controlled compression, thereby adding to the resiliency factor which maintains these couplings effectively coupled under great load variations without failure of the screw threads or loosening or weakening of the coupling members.

Furthermore, the small number per inch of coacting square screw threads having different large leads, as provided on the members and devices in accordance with this invention, makes it possible to assemble, operate and disassemble the members and devices with comparative ease and in less time and with the use of less material than would be required with a greater number of screw threads of corresponding leads.

The square formation of the threads provides greater thread strength and causes the forces developed by the coacting threads to be directed axially of the members in which such threads are formed, whereby the resiliency of such members is brought into play as a holding factor for resisting loosening of the members and for maintaining the application of the forces thus developed.

Another modified form of this invention, as shown in Figs. 7 and 8, is embodied in a differentially screw threaded bolt 21 and nut 22 for securing a member 23 to a fixed member 24. The bolt 21 and members 22 and 24 corresponding respectively to the members 1, 2 and 3 in the form of the invention shown in Figs. 1–3, in that the bolt is the medium for connecting or joining the members 22 and 24 to hold the member 23 in place.

Accordingly, the bolt 21 is provided with a single square thread 25 having its side faces 25' and 25" formed as are the differential threads on the member 3 shown in Figs. 1, 2 and 3, to serve as threads of differential leads, each lead being comparatively large, for example, as of the order of three threads per inch, and 2⅞ threads per inch respectively.

The nut 22 is provided with square threads 22' which match the leads of the side faces 25' of the screw threads 25, whereas the fixed member 24 is provided with a screw threaded bore 24' in which the square threads 24" match the lead of the side faces 25" of the screw threads 25.

The member 23 is provided with an opening 26 in which the bolt 21 is freely rotatable. However, the nut 22 is provided with a serrated or knurled surface 22" to prevent the nut from turning relative to the member 23, when the bolt 21 is tightened.

In the operation of this form of the invention, the nut 22 is screwed onto the bolt 21, after which the bolt is inserted through the opening 26 in the member 23 into the screw threaded bore 24' in the fixed member 24. Upon now turning the bolt 21 so that it will screw into the member 24, the nut 22 may turn with the bolt until the serrated surface 22" thereof comes into contact with the member 23 to restrain this turning of the nut. Thereafter, as the bolt 21 is tightened, the nut 22 and the fixed member tend to move toward one another due to the difference between the leads of the screw threads on the members 22 and 24, with the result that an effective clamping force is developed therebetween to securely hold the member 23 in place. As in the previously described forms, the extent of movement of the members 22 and 24 toward one another responsive to a tightening turning movement of the bolt 21, depends upon the amount of turning movement of the bolt and the difference between the leads of the screw threads on the members 22 and 24, as these members will move together in accordance with the difference between such leads.

Thus, it will now be seen that the bolt 21 is a connecting member comparable in function to the connecting sleeves 3 and 12 respectively of the previously described forms of this invention. The nut 22 and the fixed member 24 likewise are comparable to the members 1 and 2 shown in Figs. 1 and 3, as the nut is held against turning relative to the fixed member 24, by the serrated surface 22" engaging the member 23, thereby permitting the bolt 21 to be turned relative thereto. This form of the invention is subject to many applications. For example, the member 23 may be considered to be the cylinder head of an internal combustion engine, while the fixed member 24 may be the engine block.

Another modified form of this invention, as shown in Fig. 9, is embodied in a differentially threaded bolt 29, identical with the bolt 21 shown in Figs. 7 and 8, in that it has a single, large lead, square screw thread 30, the side faces 30' and 30" of which comprise coextensive screw threads of small differential lead of the same pitch diameter and hand. However, this form employs a pair of nuts 31 and 32 adapted to clamp between them a pair of plates 33 and 34, or similar members, which are secured one upon the other. Accordingly, the nut 31 has square screw threads 31' matching the lead of the side faces 30' of the thread 30, while the nut 32 has square screw threads 32' matching the lead of the side faces 30" of the thread 30.

Relative turning of the nuts 31 and 32 is prevented by clutch means comprising interengageable clutch elements 35 and 36 formed on the opposed ends of reduced tubular extensions 37 and 38 of the nuts 31 and 32 respectively. These extensions are disposed in registering openings 39 in the plates 33 and 34. Annular shoulders 31" and 32" on the nuts 31 and 32 respectively, engage the outer faces of the plates 33 and 34 for applying the clamping force developed by the nuts when the bolt is tightened.

This modified form operates in the same manner as the form shown in Figs. 7 and 8, as the bolt 29 when rotated, will tend to move the nuts 31 and 32 toward one another according to the difference between the leads of the screw threads on the bolt and nuts. The same advantages as to developing and maintaining desired forces with a small number of screw threads per inch, of small differential lead and of the same hand and same pitch diameter, are obtained with this form of the invention as with the forms previously described.

Another modified form of this invention is embodied in a turnbuckle, as shown in Figs. 10 and 11. This form embodies three threadedly connected members, as is the case in the other forms of the invention, there being a connecting member or sleeve 40, which may be of non-circular cross section to accommodate a wrench, and opposed members 41 and 42 joined or coupled by the sleeve 40.

The sleeve member 40 is provided with intertwining threads 43 and 44, the threads 44 occupying the spaces left blank by the threads 43. The threads 44 have a different lead than the threads 43. The threads 43 and 44 are square, as are the threads 45 and 46 on the members 41 and 42. The threads 43 and 45 are of corresponding lead while the threads 44 and 46 are of a corresponding lead different than the lead of the threads 43 and 45.

All of the threads are square and of the same hand and the same pitch diameter, as is the case with all of the forms of the invention here shown. In fact the two threads 43 and 44 in the sleeve 40 may be likened to the single-thread, two-lead arrangement shown in the previously described forms of this invention, inasmuch as in cutting the threads 43 and 45, opposite sides of the "land" portions between the grooves formed by the threads, are calibrated to have different leads. Thus, properly it may be said that opposite sides of the "threads" in the member 40 are calibrated to have coextensive differential leads for accommodating the threads 45 and 46.

As a means for holding the opposed members 41 and 42 against relative rotation and maintaining the threads thereon in continuity, the member 41 is provided at one end with a reduced projection 48 of non-circular cross section adapted to extend into a bore 49 of corresponding cross section in the member 42. This provides for a spline connection between the members 41 and 42, whereby they may be moved axially in either direction but are restrained from relative rotation.

It should be noted that the threads 43 and 44 are not mutilated and are of comparatively large lead, although of small differential lead and of equal extent throughout the length of the sleeve 40. In consequence, the turning of the sleeve 40 in either direction when engaged with the members 41 and 42, will produce the desired force for moving the members 41 and 42 toward or away from one another. Accordingly, this device obviously has useful applications beyond that of a turnbuckle.

The square threads of large lead, but of small lead differential and of the same hand and pitch diameter as provided in the members of the turnbuckle, make possible the leverage gain, the ease of assembly, operation and disassembly of the turnbuckle, as well as the other advantages which are obtained with the previously described forms of this invention.

Any form of screw thread providing sufficient stock to accommodate the cutting away of one side of the thread so that opposite sides of the thread will provide working thread surfaces of differential leads, may be employed in carrying out this invention. Thus, the term "square" as employed throughout this specification as descriptive of the threads of this invention, contemplates any thread formation in which opposite sides of the threads are normal or substantially normal to the axis of the threaded member or are disposed at such large angles as to make possible the calibration of a pair of helical surfaces of different leads and which will coact with corresponding surfaces in the manner of screw threads.

It should be noted that the several forms of this invention have common features making possible the advantages hereinbefore noted. These common features are the "square" threads of the same pitch diameter; the restraining of the pair of members joined by the connecting member against relative rotation; the provision of small differential leads on the pair of members; and the provision on the connecting member of small differential thread leads which are coextensive, that is, are convolved for the most part one within the axial extent of the other and match the leads on the pair of members.

I claim:

1. A joint comprising: a pair of members having screw threads of the same hand and same pitch diameter; the screw threads on one of said members having a greater lead than the screw threads on the other of said members; elements on said members engageable to prevent relative rotation of said members and maintain said screw threads in alignment; and a rotary connecting member having a single screw thread of the same pitch diameter and same hand as the threads on said pair of members; opposite sides of the screw thread on said connecting member constituting screw thread surfaces of differential lead corresponding to the leads on said pair of members and simultaneously engaging the screw threads on said pair of members the respective turns of the screw thread on said connecting member being spaced to enable said connecting member to be screwed substantially entirely onto the threaded portion of one of said pair of members.

2. A joint comprising: a pair of members having screw threads of the same hand and the same pitch diameter; the screw threads on one of said members having a greater lead than the screw threads on the other of said members; a rotary connecting member joining said pair of members; said rotary member having thereon a screw thread formed so that opposite sides thereof provide a pair of coextensive differential screw threads of the same hand and the same pitch diameter as the screw threads on said pair of members; the respective turns of the screw threads on said connecting member being spaced to enable said connecting member to be screwed substantially entirely onto the threaded portion of one of said pair of members; and means restraining relative rotation between said pair of members while said rotary member is turned in threaded engagement therewith; rotation of said rotary member in one direction causing the members of said pair to be urged toward one another; rotation of said rotary member in the opposite direction causing the members of said pair to be moved apart.

3. A joint comprising: a pair of opposed members adapted to be disposed so as to prevent relative rotation thereof; said members having screw threads formed with truncated crests; said threads being of the same hand and the same pitch diameter; the screw threads on one of said members having a greater lead than the screw threads on the other of said members; and a connecting member threadedly joined to said pair of members; said connecting member having a screw thread of the same hand and the same pitch diameter as the screw threads on said pair of members; the respective turns of the screw threads on said connecting member being spaced to enable said connecting member to be screwed substantially entirely onto the threaded portion of one of said pair of members; the crest of the thread on said connecting member being truncated; the side faces of said truncated thread having different leads corresponding to the different leads of the screw threads on the members of said pair and engaged therewith.

4. A joint comprising: a pair of opposed members having external screw threads with the same hand and same pitch diameter, the screw thread on one of said members having a greater lead than the screw thread on the other of said members; a rotatable sleeve; a screw thread on the interior of said sleeve providing on opposite sides thereof a pair of coextensive helical surfaces of differential lead and the same hand and pitch diameter as the threads of said pair of members engaged with the threads of corresponding lead on said pair of members; the respective turns of the screw threads on said sleeve being spaced to enable said sleeve to be screwed substantially entirely onto the threaded portion of one of said pair of members; and means on said pair of members maintaining the opposed ends of the threads thereon in continuity and permitting relative axial movement of the members of said pair responsive to rotation of said sleeve.

5. A joint comprising: a pair of opposed members having truncated screw threads of differential lead and of the same hand and pitch diameter; a rotary member connecting said members; said rotary connecting member having a truncated screw thread engaged with the screw threads on said pair of members; opposite sides of the truncated thread on said rotary member having helical surfaces of the same pitch diameter and hand as the screw threads on the members of said pair; the respective turns of the screw threads on said connecting member being spaced to enable said connecting member to be screwed substantially entirely onto the threaded portion of one of said pair of members; and means forming a splined connection of said members.

6. A joint comprising: a pair of opposed members having screw threads of differential lead and of the same hand and pitch diameter; a rotary member connecting the members of said pair; said rotary connecting member having a screw thread providing on opposite sides thereof a pair of coextensive helical portions of differential lead and the same hand and pitch diameter as the threads of said pair of members; said portions threadedly engaged with the screw threads on the members of said pair; the respective turns of the screw threads on said connecting member being spaced to enable said connecting member to be screwed substantially entirely onto the threaded portion of one of said pair of members; and means on the members of said pair cooperating to prevent relative rotation thereof including a projection of non-circular cross section one of the members of said pair; the other member of said pair having a bore of corresponding non-circular cross section in which said projection is slidably engaged.

7. A joint comprising: a pair of opposed members having internal screw threads of differential lead and of the same hand and pitch diameter; and a rotary connecting member having an external screw thread thereon providing on opposite sides thereof a pair of coextensive helical surfaces of the same pitch diameter and hand as the threads of said pair and having differential leads corresponding to the leads of and engaging the screw threads on said pair of members; the respective turns of the screw threads on said connecting member being spaced to enable said connecting member to be screwed substantially entirely onto the threaded portion of one of said pair of members; and means on said pair of members restraining relative rotation thereof; rotation of said rotary member while the said pair of members are restrained from relative rotation, causing said pair of members to be moved axially relative to one another and said rotary member.

8. A joint comprising: a pair of externally screw threaded tubular members each having truncated screw threads of the same hand and pitch diameter and providing helical side faces substantially normal to the axis thereof; the thread on one of said members having a greater lead than the thread on the other of said members; a rotary sleeve connecting said members; a screw thread within said sleeve providing on opposite sides thereof a pair of coextensive internal helical portions of differential leads corresponding to the leads of the screw threads on said pair of members and engaged therewith; said pair of helical portions having the same pitch diameter as the threads on said pair of members; the respective turns of the screw threads on said sleeve being spaced to enable said sleeve to be screwed substantially entirely onto the threaded portion of one of said pair of members; and means on the members of said pair cooperable to maintain the ends of said threads on said tubular members in threadedly aligned relation.

9. A coupling, comprising: a pair of tubular coupling members; said members having screw threads of the same hand and pitch diameter; the screw threads on one of said members being of greater lead than the screw threads on the other of said members; a connecting member having thereon a single screw thread of the same pitch diameter and hand as that of the threads on said pair of members; means on opposed ends of said tubular members engageable to form a seal at the joint thereof; said single thread having opposite sides thereof formed to provide screw portions of differential lead and in threaded engagement with the threads of corresponding lead on said pair of members; the respective turns of the screw threads on said connecting member being spaced to enable said connecting member to be screwed substantially entirely onto the threaded portion of one of said pair of members; and means on said ends restraining relative rotation of said pair of members and permitting relative axial movement thereof.

10. In a clamping device; a pair of opposed members adapted to clamp work therebetween; said members having internal screw threads with the same hand and same pitch diameter; the screw threads on one of said members being of greater lead than the screw threads on the other of said members; tubular extensions on said members adapted to extend toward each other and to engage one another to prevent relative rotation of said members; work-contacting shoulders on said members; and a rotatable externally screw threaded connecting member in threaded engagement with said pair of members; the respective turns of the screw threads on said connecting member being spaced to enable said connecting member to be screwed substantially entirely onto the threaded portion of one of said pair of members; said rotatable member having a single screw thread thereon; opposite sides of said single thread being formed with a pair of helical surfaces of differential lead and of the same pitch diameter and hand as the threads of said pair corresponding to the leads of the respective members of said pair;

said helical surfaces being simultaneously engaged with the threads on said pair of opposed members.

11. In a clamping device; a pair of opposed members adapted to clamp work therebetween; said members having internal screw threads with the same hand and same pitch diameter; the screw threads on one of said members being of greater lead than the screw threads on the other of said members; and a rotatable externally screw threaded connecting member adapted for threaded engagement with said pair of members; said rotatable member having a single screw thread thereon; said single thread providing on opposite sides thereof a pair of coextensive helical surfaces of differential lead and of the same pitch diameter and hand as the threads of said pair corresponding to the leads of the respective members of said pair; said surfaces being simultaneously engaged with the threads on said pair of members; one of the members of said pair having a roughened surface for contacting the work to prevent relative rotation between the members of said pair and the respective turns of the screw thread on said connecting member being spaced to enable said connecting member to be screwed substantially entirely onto the threaded portion of one of said pair of members.

12. A joint including a bolt having a screw thread providing on opposite sides of the thread a pair of coextensive helical portions each of which has a different lead and each of which has the same pitch diameter and same hand; one of said helical portions adapted to be threadedly engaged with a member having screw threads of corresponding lead; and a clamping member threaded on said bolt and having screw threads with the same pitch diameter, hand and of a lead corresponding to the other of said helical portions; the respective turns of the screw threads on said clamping member being spaced to enable said clamping member to be received substantially entirely onto the helical portion of one of said pair of portions; and said clamping member having a roughened work-contacting surface for preventing rotation of said clamping member relative to the work engaged thereby.

13. A joint comprising: a pair of members having screw threads of the same hand and same pitch diameter; the screw threads of one of said members having a greater lead than the screw threads on the other of said members, a rotary connecting member having a thread of the same pitch diameter and same hand as the threads on said pair of members; a rotary connecting member having a screw thread of the same pitch diameter and same hand as the threads on said pair of members; opposite sides of the screw thread on said connecting members constituting screw threads of differential lead corresponding to the leads on said pair of members to engage the screw threads thereof and the respective turns of the screw threads on said connecting member being spaced to enable said connecting member to be received substantially entirely onto the threaded portion of one of said pair of members.

References Cited in the file of this patent

UNITED STATES PATENTS

| | | |
|---|---|---|
| 758,278 | Rapp | Apr. 26, 1904 |
| 1,035,118 | Goldsman | Aug. 6, 1912 |
| 1,326,970 | Row et al. | Jan. 6, 1920 |
| 1,537,819 | Grimm | May 12, 1925 |
| 1,589,781 | Anderson | June 22, 1926 |
| 1,872,166 | Muhlig | Aug. 16, 1932 |
| 2,374,266 | Barr | Apr. 24, 1945 |
| 2,426,083 | Corlett | Aug. 19, 1947 |
| 2,485,280 | Grace | Oct. 18, 1949 |

FOREIGN PATENTS

| | | |
|---|---|---|
| 5,417 | Great Britain | Nov. 14, 1882 |
| 5,591 | Great Britain | Apr. 4, 1884 |
| 17,482 | Great Britain | Aug. 20, 1908 |
| 4,893 | Great Britain | Aug. 7, 1913 |
| 359,961 | Great Britain | Oct. 30, 1931 |